Patented Dec. 22, 1931

1,838,071

UNITED STATES PATENT OFFICE

MORTIMER T. HARVEY, OF NEW YORK, N. Y., ASSIGNOR, BY DIRECT AND MESNE ASSIGNMENTS, TO THE HARVEL CORPORATION, A CORPORATION OF NEW JERSEY

PLASTIC MATERIALS AND PROCESS OF MAKING THE SAME

No Drawing.    Application filed July 1, 1926.    Serial No. 119,990.

The present invention relates to processes of making materials plastic or of increasing their plasticity, to material for use in such processes, and to compositions of material which are temporarily or permanently plastic and which are useful in the arts generally.

The invention consists in forming and applying a product having the general characteristics, the new and useful applications, and the several original features of utility hereinafter set forth and claimed.

The oil from the shell cashew nut, I find, is of great value in making various materials plastic among which are sulphur, resins, gums such as cumarin, waxes, rubber, pitch, cellulose products, such as pyroxylin, celluloid, cellulose nitrate cellulose acetate, leather, artificial leather, bakelite, and so on.

In other words, I find that cashew nut shell oil is useful in rendering certain implastic materials plastic, and in giving greater plasticity to certain plastic materials whether originally of high or low viscosity.

The cashew shell oil is useful for this purpose both in its natural state and in combination or in mixture with one or several of the above mentioned materials or with other materials such as formaldehyde, glycerol, castor and so on.

When it is desired to render a material plastic or more plastic for the purpose of working or forming it and then to have it harden, stiffen or set, I mix with it a material which will harden or set it upon the application of heat or after the passage of a reaction time period. Such a material is copper oxide, barium oxide or hydroxide, alkaline oxide or hydroxide, zinc oxide, iron oxide, granulated metal such as copper, lead, aluminum, iron or the like. In some cases the hardening reaction substance is utilized as a filler for molded compound substances and the like. An example of such a composition, I use a mixture of seventeen parts of cumarin by weight, two parts cashew shell oil, and one part of copper oxide. The mixture itself can be used for making molded compounds, also filler material such as barytes, asbestos and the like can be added to it to the desired composition.

Sulphur plasticized with cashew shell oil is highly useful for use as a vulcanizer for rubber because of the ease with which it can be thoroughly and uniformly intermixed therewith.

Another application of the invention is a solution or mixture of two parts by weight of cumarin resin to one part of cashew shell oil applied to tapes or the like for use as an electrically insulating covering. Rubber tape is also made in this manner.

An example of a cellulose material is nine parts of cellulose acetate by weight and one part of cashew nut shell liquid, the latter as a plasticizer. This material can be taken up and applied with a suitable thinner, or it can be used without the thinner.

By using small proportions of the oil, say 2 to 5%, more or less, with cellulose materials, rubber, gums, or other material a covering or filling material of a varnish or paint like nature is made which when applied with a solvent such as benzol, naphtha or the like and dried presents a dried flexible body. Such a material has application or use for filling and coating the cloth coverings on electric wires and is applied by running the wire through a bath of the solution and then drying the solvent out.

The valuable qualities of the cashew nut shell oil in its application to the present invention lie in the characteristic it has of dissolving rubber, sulphur, cellulose nitrates, acetates, etc., and the other substances mentioned in quantities ranging from the smallest to a great many times the amount of the oil itself, and, further, that such solutions are permanent.

Although I have set forth and described several processes for producing embodiments of the product of the invention, it is obvious that various changes may be made in the process or in the several steps thereof without modifying or changing essential features and characteristics of the product produced and that products have a wide range of use and application and have various appearances, textures and physical and chemical characteristics.

It is to be understood that cashew nut shell oil comprises mainly substances known as cardol and anacardic acid and that the claims herein made extend to cover either or both of these substances, whether originating from a natural source or made artificially.

Having thus described my invention, what I claim as new and desire to secure by Letters Patent is:

1. A solution of a cellulose ester in cashew nut shell oil.

2. A material adapted to be applied with a solvent which is to be dried out therefrom, comprising a solution of a cellulose ester and cashew shell oil in a vaporizable organic solvent.

3. A solution of one part of cashew shell oil and nine parts of cellulose acetate by weight, in an organic solvent.

4. A solution of cellulose acetate in cashew nut shell oil.

5. A composition having as a base thereof a cellulose ester, cashew nut shell oil and a setting material.

6. A material adapted to be applied with a solvent which is to be dried therefrom, having as the base thereof a cellulose ester, cashew nut shell oil and a setting material, with an organic solvent as a carrier therefor.

7. A composition of matter comprising material selected from the group consisting of sulphur, gums, resins, waxes, pitches, cellulose nitrate and cellulose acetate, and rubber, and a plasticizer therefor of cashew nut shell oil.

8. A composition of matter comprising material selected from the group consisting of sulphur, gums, resins, waxes, pitches, cellulose nitrate and cellulose acetate, a plasticizer therefor of cashew nut shell oil, and a setting material.

Signed at New York in the county of New York and State of New York this 25th day of June A. D. 1926.

MORTIMER T. HARVEY.